Dec. 30, 1969  C. R. LAUBENFELS  3,486,386
DIAL DEVICE WITH OPTIONAL STOP MEANS
Filed June 28, 1968

INVENTOR.
CLARENCE R. LAUBENFELS
BY
ATTORNEYS.

United States Patent Office 3,486,386
Patented Dec. 30, 1969

3,486,386
DIAL DEVICE WITH OPTIONAL STOP MEANS
Clarence R. Laubenfels, 333 Scholl Drive,
Glendale, Calif. 91206
Filed June 28, 1968, Ser. No. 741,040
Int. Cl. F16h 35/18; G05g 5/04
U.S. Cl. 74—10.2                                    12 Claims

ABSTRACT OF THE DISCLOSURE

This invention relates to a dial device having a turn-limiting stop means that is readily adjustable so that an exact number of turns can be made at which time rotation is positively stopped. The stop means is disposed in the dial device, and the element being controlled, for example a rotary potentiometer, need not be equipped with stops, and need not resist turning torque exerted on the system after it has been stopped. The stop means is optional and can readily be removed. Because of its unique construction, it does not take up any part of the angular subtense of the output shaft, and the dial device can thereby use its regular graduations to read out motion beyond the normal range limited by the stop means. A brake device can optionally be added to hold an adjustment, once made.

---

Figure 2:
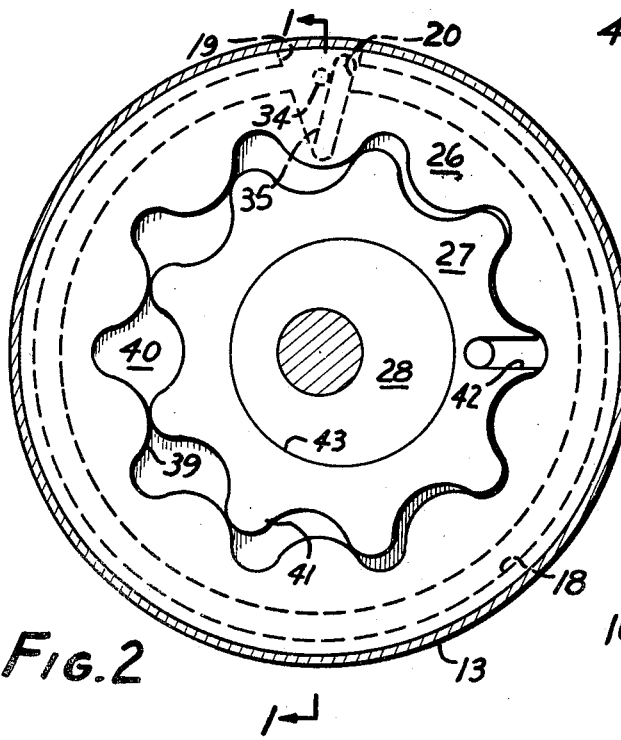

This invention relates to a dial device which is useful in turning a part of some other element, such as the shaft of a rotary potentiometer. It includes an optional stop means precisely to limit the rotation of the device to a specified number of turns. The stop means can be removed, and the dial device and its graduation are used in the range beyond that which is normally limited by the stop means.

Dial means with turn-limiting functions are known from Laubenfels Patent No. 3,069,914, issued Dec. 25, 1962. Such devices customarily have a shaft for an input and an output. An internal stop is provided to limit the rotation of the shaft to a pre-selected number of turns. Such devices work well, but have some inherent limitations which it is the object of this invention to alleviate.

For example, in the aforesaid Laubenfels patent, close adjustment of the stop is accomplished by changing the spread of a pair of tabs. Such adjustments may have a tendency to creep, and a solid abutment is to be preferred, because it will not creep.

Another example of an inherent limitation resides in the fact that the stop means is engaged on one side to stop rotation in one direction, and on the other side to stop rotation in the opposite direction. In conventional devices, this means that the stop itself occupies a percentage of the angular subtense of the dial's rotation, so that were the stop removed, the graduations would be meaningless beyond the range ordinarily limited by the stop means.

The foregoing limitations are overcome in this device. The stop means comprises a stop pin disposed in a lateral groove, which stop pin can be forced to one side or the other of the groove by a boss carried by a ring gear. The location of the boss where it stops is the same for both directions of its motion, and the limitation is accomplished by a solid abutment. Adjustment is made simply by selecting a stop pin having the precisely correct diameter needed to stop the boss at the correct point. Furthermore, because the boss makes an exactly 360° revolution between limited positions, the dial can be used with its graduations for any arbitrary number of revolutions extending beyond the range of ordinary use that occurs when the stop pin is used. The device is thereby rendered far more versatile than already-known dial devices which include stop means.

A device according to this invention includes a case, a ring gear having a plurality of internal gear teeth and a central axis, said ring gear being journaled to the case for rotation around its own axis. A spur gear has a plurality of external gear teeth, the number of teeth on the two gears being different, and the number on the spur gear being smaller than the number on the ring gear. The spur gear has a radial slot and is disposed within the ring gear, the central axes of the gears being spaced apart when the gear teeth are engaged. The outer diameter of the spur gear teeth is enough less than the inner diameter of the ring gear teeth that the teeth of the two gears can successively engage without interference. The teeth are, of course, shaped such that they can successively mesh and one gear can thereby be driven by the other. A pin is mounted to the case and projects into the spur gear slot to limit the spur gear to oscillatory movement. An eccentric is mounted to the case and has a center of rotation coincident with the central axis of the ring gear, and an eccentric engagement with the spur gear coincident with the central axis of the spur gear. By this arrangement, the rotation of the eccentric causes oscillatory movement of the spur gear, each oscillation turning the ring gear relative to the spur gear to an angle which is a function of the difference in number of teeth on the gears. A peripheral relief is formed in the case facing toward and adjacent to the ring gear. A boss is mounted to the ring gear and projects into the relief so it is free to travel therein a full 360° rotation. A first and a second wall are formed in the base, forming an angle opening into the relief. A stop pin is disposed within said angle and adapted to bear against either wall, and projecting into the relief in the path of the boss. The thickness of the pin and the boss, and the spacing apart of the walls, are such that the center of the boss is at the same angular position regardless of which wall the boss presses the pin against.

Figure 1:
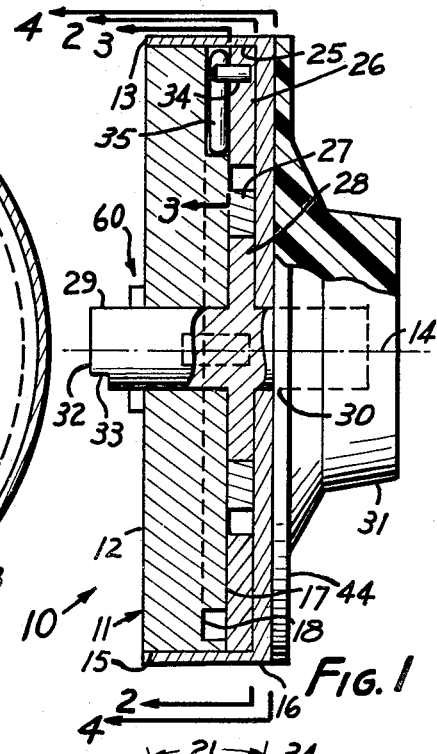
Figure 3:
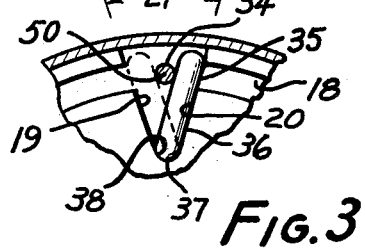
Figure 5:
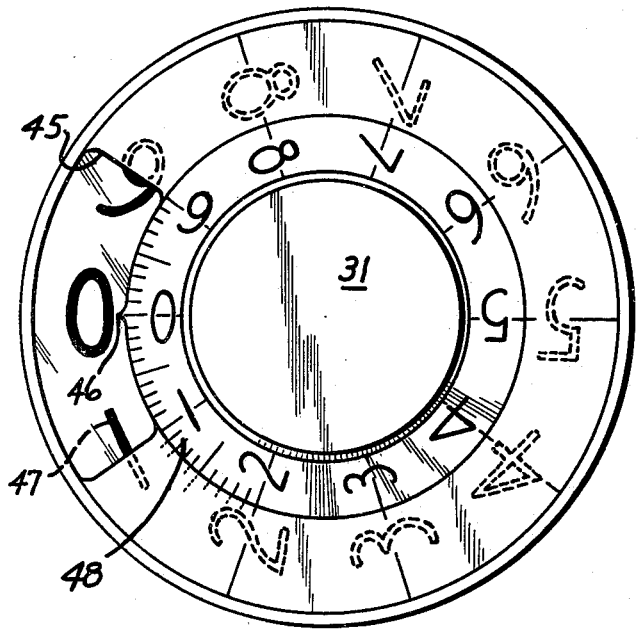
Figure 4:
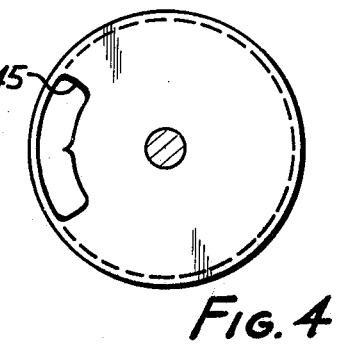

This invention will be fully understood from the following detailed description and the accompanying drawings in which:

FIG. 1 is a side elevation, principally in axial cross-section, showing the presently preferred embodiment of the invention;

FIGS. 2, 3 and 4 are cross-sections taken at lines 2—2, 3—3 and 4—4, respectively, of FIG. 1; and FIG. 5 is a right-hand end view of FIG. 1.

The presently preferred embodiment of a dial device 10 is shown in FIG. 1. It includes a case 11 which has two parts, a base 12 and a cover 13. The case has a central axis 14 and is conveniently made cylindrical. The base has an outer cylindrical wall 15 which is embraced by a flange 16 on the cover. The base includes a surface 17 in which there is formed a peripheral relief 18 as a circular groove that extends a full circle around the central axis in surface 17. There are also formed a first and second wall 19, 20, respectively, disposed at an angle 21 (see FIG. 3) to each other which opens into the peripheral relief, and projects on both sides thereof.

A cavity 25 is formed between the cover and the base which houses a ring gear 26 and a spur gear 27. The spur gear is disposed inside the ring gear in a manner yet to be described. There is also housed therein an eccentric 28, which eccentric is mounted to shaft 29, which shaft has an input end 30 with an enlarged knob or dial 31 thereon and an output end 32 with an adaption such as a flat 33 for attachment to an element to be rotated such as the input shaft of a rotary potentiometer (not shown). In fact, the shaft of the potentiometer may be substituted for shaft 29. The ring gear has a boss 34 in the form of a round pin fixed therein, and it projects into the peripheral relief so that as the ring gear turns, the boss moves along the peripheral relief. A stop pin 35 has a cylindrical wall 36 and a rounded end 37. The rounded end preferably has approximately the same radius as a rounded vertex 38 of the angle formed by walls 19 and 20 so that the pin can swing freely from side to side as shown in FIG. 3, wherein one extreme is shown in solid line, and the other in broken line. However, the radius of end 37 is not critical. The stop pin extends completely across the peripheral relief and is adapted to abut walls 19 and 20.

As can best be seen in FIG. 2, the ring gear has a plurality of teeth 39 which face inwardly into a cavity 40. The ring gear is snugly fitted into the cavity so that it does not shift sidewise but is freely rotatable therein.

The spur gear has a plurality of teeth 41 which are external, and it has a spur gear slot 42 opening onto its side. A pin projecting from the case into the slot limits the spur gear to oscillatory movement. In addition, the spur gear has a central journal 43 in which eccentric 28 fits. It will be observed that the ring gear and spur gear have different numbers of teeth, the spur gear having the lesser number. The dimensions of the teeth are selected such that when the spur gear oscillates, there is no interference between them.

A transparent plate 44 overlays the cover. This plate may conveniently form a part of the knob, or may be a separate plate keyed to the knob for rotation with it. The cover has a cutout 45 with a pointer 46 therein through which numbers 47 can be seen. The pointer is on the stationary cover, and the numbers 47 are on the surface of the ring gear facing the cover. The transparent plate 44 has graduations and numbers 48 which pass by the stationary pointer and indicate fractional rotation of the shaft.

A brake 60 of any desired type can be mounted to the case and selectively be clamped to or released from the shaft or knob to hold an adjusted position.

The operation of the device will now be described. Assuming that the angular rotation is limited as shown in FIGS. 2 and 3, it is evident that rotation can occur only in the counterclockwise sense which will move the boss away from the stop pin. In the condition illustrated, the boss is stopped at point 50 which is spaced angularly from wall 20 by a distance determined by the diameters of the boss and of the stop pin. Now if the dial is rotated counterclockwise, the spur gear will be eccentrically rotated, and for every oscillation, it will turn the ring gear by one increment. Because there are ten teeth on the ring gear, each increment is one-tenth of a rotation. The numbers of rotations made can be read from the full numbers carried by the ring gear, and the percentages of them by reading the numbers and graduations carried by the transparent plate read against point 46. After one full revolution, the stop pin will be pressed in the opposite direction against wall 19 as shown in dotted line in FIG. 3, instead of against wall 20. It will be noted that the distance of point 50 from wall 19 will again be a function of the diameter of the stop pin and of the boss. Therefore, if point 50 were not the point of termination of the boss in both cases, a close adjustment can be made simply by removing and replacing the stop pin with one having a different diameter which would cause stoppage at the appropriate point. It will thereby be seen that all that is required is an initial selection of the stop pin at the factory, and thereafter no additional adjustment will be required, because all of the stoppage is accomplished by a direct solid abutment bearing between the boss, the stop pin and one of walls 19 or 20.

At any desired adjustment, brake 60 can be set to hold the shaft against rotation until the brake is released.

Assuming now that it is desired to use the device as a dial beyond its limited range, it will be noted that removal of the stop pin is all that is required. No angular subtense has been taken up by the stop mechanism, and the device can be used for an unlimited range without complication, and the same graduations can be used.

This device is therefore free of many of the limitations of the prior art, is rugged, easily adjusted at the factory, and easily converted from a turn-limiting mechanism to a dial mechanism without limit simply by pulling the cover off and removing the stop pin and then placing the cover back onto the base. All limiting forces are exerted outside the device being controlled or adjusted.

I claim:

1. A dial device with an optional stop means comprising: a case, a ring gear having a plurality of internal gear teeth and a central axis, said ring gear being journaled to the case for rotation around its own axis; a spur gear having a plurality of external gear teeth, the number of teeth on the two gears being different, the spur gear having fewer teeth, a central axis and a radial slot, and being disposed within the ring gear, the central axes of the gears being spaced apart with the gear teeth engaged, the outer diameter of the spur gear teeth being enough smaller than the root diameter of the ring gear teeth that teeth of the two gears can successively engage without interference; a pin mounted to the case and projecting into the spur gear slot to limit the spur gear to oscillatory movement; an eccentric mounted to the case having a center of rotation coincident with the central axis of the ring gear, and an eccentric engagement with the spur gear coincident with the central axis of the spur gear, and means for turning the eccentric, whereby rotation of the eccentric causes oscillatory movement of the spur gear, each oscillation turning the ring gear relative to the spur gear through an angle which is a function of the difference in number of teeth on the gears; a peripheral relief in the case facing toward and adjacent to the ring gear; a boss mounted to the ring gear and projecting into the relief; a first and second wall in said base forming an angle opening into the relief; and a stop pin within said angle adapted to bear against either wall and projecting into the relief in the path of the boss, the thickness of the pin and of the boss, and the spacing apart of the walls, being such that the center of the boss stops at the same angular position regardless of which wall the boss presses the pin against.

2. A dial device according to claim 1 in which graduations and numbers are placed on the ring gear, and in which a portion of the case is removed to give visible access thereto.

3. A dial device according to claim 2 in which said means for turning said eccentric includes an input shaft attached to the eccentric, a dial is attached to the input shaft, and graduations and numbers are applied to the dial for reading fractional rotation.

4. A dial device according to claim 1 in which a brake is disposed within the system defined between the case and an output from the ring gear.

5. A dial device according to claim 1 in which the said angle includes a rounded vertex and in which the stop pin has a rounded end of substantially the same radius.

6. A dial device according to claim 5 in which the boss is a round pin.

7. A dial device according to claim 1 in which the means for rotating the eccentric is a shaft which is rigidly mounted to the eccentric and journaled in the case, the shaft having an input end and an output end.

8. A dial device according to claim 7 in which graduations and numbers are placed on the ring gear and in which a portion of the case is removed to give visible access thereto.

9. A dial device according to claim 8 in which said input end is attached to the eccentric, a dial is attached to the input end of the shaft, and graduations and numbers are applied to the dial for reading fractional rotation.

10. A dial device according to claim 9 in which a brake is disposed within the system defined between the case and the output end.

11. A dial device according to claim 7 in which the said angle includes a rounded vertex and in which the stop pin has a rounded end of substantially the same radius.

12. A dial device according to claim 7 in which the case comprises a base and an overlying embracing cover, which cover encloses the gears and eccentric and is removable to give access to the stop pin, whereby the said stop pin may be removed.

References Cited

UNITED STATES PATENTS

| 2,903,893 | 9/1959 | Scott et al. | 74—10.2 |
| 3,069,914 | 12/1962 | Laubenfels | 74—10.2 |
| 3,411,336 | 11/1968 | Leto | 74—10.2 |

MILTON KAUFMAN, Primary Examiner

U.S. Cl. X.R.

74—526; 116—115

UNITED STATES PATENT OFFICE
CERTIFICATE OF CORRECTION

Patent No. 3,486,386                                         December 30, 1969

Clarence R. Laubenfels

It is certified that error appears in the above identified patent and that said Letters Patent are hereby corrected as shown below:

Column 6, line 6, "3,411,336" should read -- 3,411,366 --.

Signed and sealed this 23rd day of February 1971.

(SEAL)
Attest:

Edward M. Fletcher, Jr.                    WILLIAM E. SCHUYLER, JR.
Attesting Officer                                   Commissioner of Patents